2 Sheets—Sheet 1.
J. ROY.
HORSESHOE NAIL MACHINE.
No. 6,776. Reissued Nov. 30 1875.
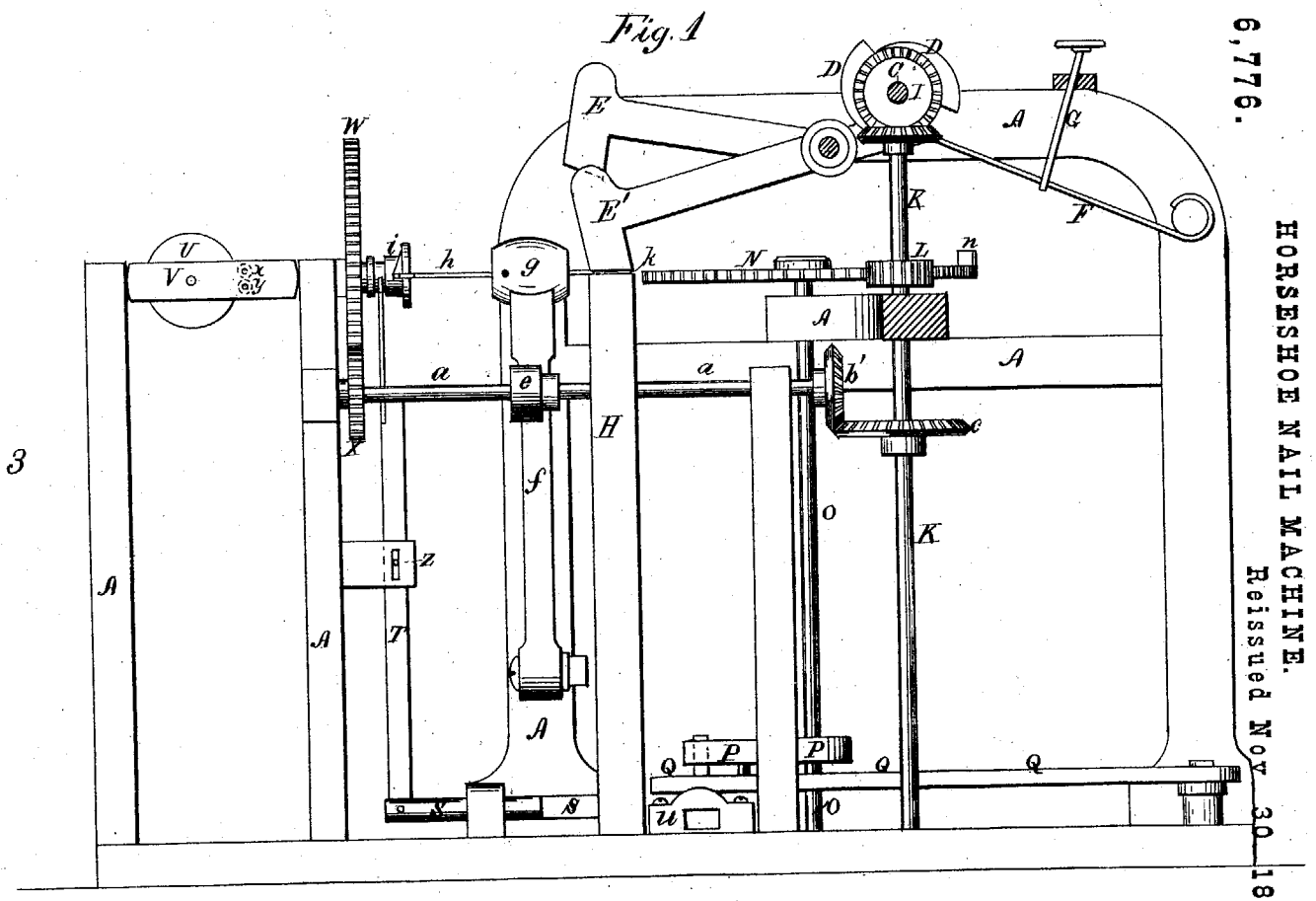
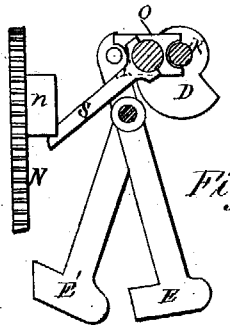
Witnesses;
Grenville Lewis
W. E. Schaffer
Inventor
Joseph Roy
by his attys
Stansbury & Munn
N. PETERS, PHOTO-LITHOGRAPHER, WASHINGTON, D. C.

J. ROY.

HORSESHOE NAIL MACHINE.

No. 6,776. Reissued Nov. 30, 1875.

Witnesses;
Grenville Lewis
W. Schaffer

Inventor
Joseph Roy
by his attys
Stansbury & Munn

N. PETERS, PHOTO-LITHOGRAPHER, WASHINGTON, D. C.

UNITED STATES PATENT OFFICE.

JOSEPH ROY, OF PHILADELPHIA, PENNSYLVANIA.

IMPROVEMENT IN HORSESHOE-NAIL MACHINES.

Specification forming part of Letters Patent No. 169,044, dated October 19, 1875; reissue No. 6,776, dated November 30, 1875; application filed November 17, 1875.

*To all whom it may concern:*

Be it known that I, JOSEPH ROY, formerly of Chicago, Illinois, now of Philadelphia, in the State of Pennsylvania, have invented certain new and useful Improvements in Horseshoe-Nail Machines; and I do hereby declare the following to be a full and correct description of the same, reference being had to the accompanying drawings, in which—

Figure 2:
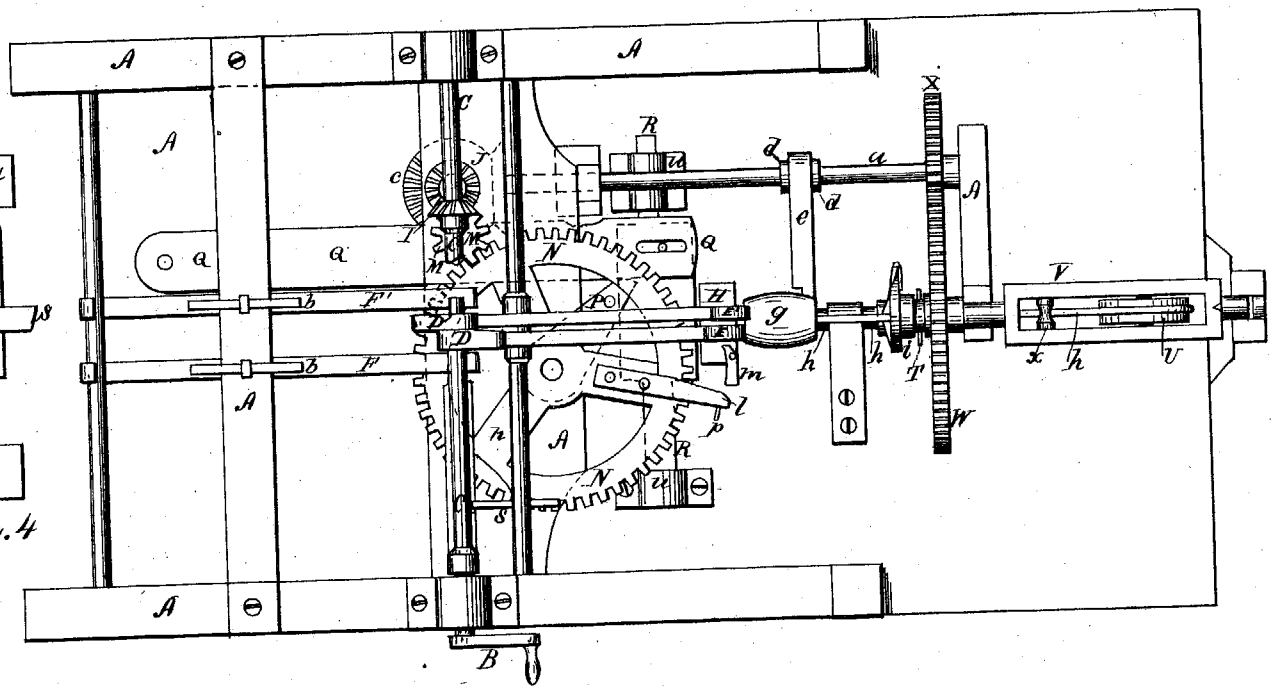
Figure 4:
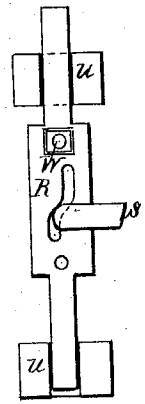
Figure 5:
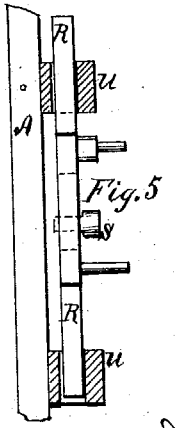

Figure 1 is a side elevation of the machine. Fig. 2 is a top or plan view of the same. Figs. 3, 4, and 5 are detail views.

The same letter indicates the same part wherever it occurs in the drawings.

This invention relates to machinery for making nails by a continuous and automatic operation, the nail-rod being subjected to the direct action of a uniform heat from a gas-flame during the process of forging. It consists of improvements on the machine for forging horseshoe-nails for which Letters Patent No. 58,485 were granted to me October 2, 1866, resulting in a great simplification of the mechanism described in that patent for operating the working parts, and in advantageous changes in the method of feeding and heating the nail-rod, of turning it upon the anvils, and of severing the finished nail from the rod, all as hereinafter more particularly set forth.

The essential elements of my improved nail-machine are, first, the use of a constant and uniform source of heat for heating the nail-rod; and, second, the employment of automatic mechanism for feeding the rod and forging the nail.

The operation of an automatic mechanism, at a given adjustment, being necessarily constant, the result produced by it would not be uniform unless the condition of the material upon which it works, were undeviating.

In a nail-machine in which the heated rod is subjected to a fixed number of blows of equal force, delivered in an unchanging order and direction, the nails produced would not be alike unless the nail-rod were presented to the action of the forging mechanism at a perfectly unvarying temperature. If the rod were made hotter than the standard temperature the nail would be longer and thinner, and if cooler it would be shorter and thicker than desired. The action of the forging mechanism, at a given adjustment, being absolutely unvarying, it is essential that the heat applied to the rod should be equally so, in order that a uniform product be obtained. Hence, the employment of the flame of gas, in some suitable device for applying it, as the means of heating the rod becomes an indispensable part of my invention, as all other fires or sources of heat known to me are subject to continual variations in the quantity of heat generated by them, arising from changes in the quality, quantity, and condition of the fuel under combustion. The gas fire, on the contrary, can always be so perfectly controlled as to furnish for an indefinite period, under constant conditions, an invariable source of heat, and thus insure the presentation of the rod to the forging mechanism in a uniform state of cohesion and temperature.

To enable others to make and use my improved machine, I will proceed to describe in detail its construction and operation.

In the drawings, A marks the frame of the machine, which consists of a heavy bed-plate, with suitable iron uprights and cross-beams to support the working parts. B marks the point of application of the driving-power at the end of the main shaft C. On this shaft are placed two cams, D D′, which operate to trip the heels of the hammers E E′, by which, in conjunction with proper dies, the forging is performed. These hammers are aided in their downward blow by the springs F F′, which react against studs *a′ a′* on the sides of the heels of the hammers, respectively. These springs are attached to the side frame of the machine, as shown, and their tension is adjusted by the straps G, attached at their lower ends to the springs, and adjusted at their upper ends by means of the keys or wedges *b b*, or by means of adjusting-screws, as preferred. By this arrangement each spring can be adjusted independently of the other, and the force of the blow of each hammer regulated accordingly. H is the post or anvil-block, on which are supported the anvil-dies or matrices *k*, which cooperate with the hammers in forming the nail. There are two of these dies, corresponding in number with the hammers, one die forming, with its corresponding hammer, the flat side of the nail, and the other die, with its hammer, forming the edge of the nail. On main shaft C is fixed a bevel-pinion, I, which meshes into a corresponding gear, J, of equal size and number of teeth, on the upper end of vertical shaft K. On shaft K is gear L, which meshes into intermediate gear M, which works in gear N on upright shaft O, and drives that shaft. On the upper end of shaft O is the large gear-wheel N, which carries the movable cutter *l*, which co-operates with the stationary cutter *m* in severing the finished nail from the rod, as hereinafter described. On the upper side of the rim of wheel N is placed a cam, *n*, which operates the sliding stop *o*, which at the proper instant arrests the blow of the hammer E by its interposition between the shaft C and the stud on the rear end of the hammer-helve.

Attached to the lower part of shaft O is an arm, P, having a pin projecting downward, which engages with and operates a lever, Q. This lever operates in one direction a sliding scroll or cam, R, which moves in ways or collars on the bed-plate of the machine. The scroll is driven in the opposite direction by the end of arm P striking pin *w*. A connecting-rod, S, having a stud or pin projecting down into a slot in the scroll R, is connected at its other end to the lever T, which has its fulcrum at *z*, and carries at its upper end a clutch, *i*, through which the nail-rod passes. U marks a spool, on which the nail-rod *h* is wound in a continuous strip of indefinite length. I prefer to wind on the spool a sufficient length to supply the consumption of a single day. The spool U is hung in a reel, V, having horizontal journals, the forward one of which is made hollow, to allow of the passage of the nail-rod to the furnace and the dies. The rod, as it passes from the spool, goes between two rollers, *x y*, which straighten and guide it, and which are made to regulate its tension by means of adjusting-screws, (not shown,) which determine the pressure of the rollers on the rod. On the forward hollow journal of the reel U is fixed a large gear, W, which meshes into and is driven by pinion X on the end of the horizontal shaft *a*. This shaft has a bevel-pinion, *b'*, on its other end, which meshes into a bevel-gear, *c*, on upright shaft K. The gear W makes one revolution to two revolutions of the main shaft C, and turns the nail-rod continuously in one direction at the same rate of movement. *d* is an eccentric on shaft *a*, turning in one end of the connecting-rod *e*, the other end of which is connected with and operates the lever *f*, supporting the fire-box or furnace *g*, through which the nail-rod *h* passes to be heated just before reaching the dies.

The furnace *g* is similar in general construction and principle of operation to that described in my Patent No. 86,456, dated February 2, 1869.

The heat is produced by the gas-flames from compound blow-pipes, which flames are projected upon the nail-rod through the apertures in the sides, bottom, and top of the furnace, and extend out between the dies and the hammers, so as to envelop the rod during the whole time that it is undergoing the operation of forging. This almost entirely prevents the great waste by oxidation which occurs in the ordinary method of nail-making, in which the heated metal is exposed to the direct action of the atmosphere.

The furnace *g* is caused, by the oscillation of the lever *f*, to present the heated nail-rod alternately under the hammers E and E', and in their respective dies.

The sliding stop *o* slides on a stud projecting into it from the side framing. It is drawn away from the cam D by means of a retracting-spring, and is drawn toward that cam by the operation of the cam *n* on the upper edge of the rim of wheel N upon arm *s*, projecting from stop *o*. A forked head on the end of the stop *o* slides on the main shaft C above. The fork on the lower side of the head engages with the same pin, *s'*, on the heel of the hammer E upon which the spring F reacts.

The movement of the stop *o* is so timed that it stops the descent of the hammer E at the instant when, but for the arresting action of the stop, it would strike the finished nail on its narrow side or edge. The object of this movement is to allow the cutters *l m* to sever the finished nail from the rod while the nail is on its edge.

I prefer to give such shape to the cutters as will impart a rounded form to the head of the nail, instead of cutting it off square, as in the ordinary machines.

In order to afford support to the nail, and prevent it from moving at the instant of being severed, and thus receiving an irregular form as to its head, I place a pin, *p*, in the face of the revolving cutter *l*, which projects beyond the cutter, and comes over the nail, to hold it down upon the die, just before it is severed from the rod. In this way perfect uniformity in the cut of the nail-head is secured.

The nail-rod is fed to the gas-furnace and dies by means of the reciprocating clutch *i*, on the face of which are two dogs or pawls, so arranged as to drive the nail-rod forward toward the anvil, and to slide backward on the rod toward the reel when the clutch moves back. While the clutch is moving back the rod is prevented from going back with it by the guide-rollers *x y*.

The gear W, as before observed, makes one revolution to two revolutions of the main shaft. Each revolution of the main shaft causes a blow to be given by each of the hammers E E'. It follows that at each revolution of gear W the nail-rod receives four blows—two by hammer E', which forms the flat side of the nail, and two by hammer E, which forms the edge of the nail, the rod being turned through ninety degrees after receiving each blow before receiving the succeeding one. The gear N is ordinarily timed to make one revolution to sixteen revolutions of main shaft C, so that each nail would receive thirty-two blows, but for the arrest of the last blow, to allow the cutter to sever the finished nail from the rod.

The relative speed of the main shaft and the shaft of gear N may be indefinitely varied, as the nature of the work may require.

The nail-rod is heated on its way to the hammers by passing through the furnace *g*, which oscillates with arm *f*, in such time as to present the heated end of the rod alternately under the two hammers. When in the die under hammer E′, the flat or broad side of the nail is produced, while the narrow side or edge of the nail is produced in the die under hammer E. The relative force of the blows of the two hammers admits of indefinite regulation by means of the devices for adjusting the actual and relative tension of the springs F F′.

By regulating the gas-flame from the blowpipe, as well as the number and force of the blows of the hammers, I have every element of the manipulation of the rod under perfect control, and can vary the length, thickness, and form of the nail at will.

The length of rod fed to the dies and hammers for each nail depends on the throw of lever T, which can be regulated by altering the position of its fulcrum *z* in the frame, or in any other convenient manner. The position of the stationary cutter *m* regulates the length of the head of the nail.

Having thus fully described my invention, what I claim, and desire to secure by Letters Patent, is—

1. In a nail-machine, the combination of the reel V, spool U, and rollers *x y* with mechanism for feeding the nail-rod to the furnace and hammers, for the purpose of securing an uninterrupted feed, as specified.

2. The combination of the furnace or firebox *g*, the lever *f*, and mechanism for imparting to it a lateral oscillating movement, with the hammers E E′ and anvil H, as and for the purpose set forth.

3. The apparatus for feeding the nail-rod to the hammers, consisting of the lever T, with its fulcrum *z*, rod S, slide R, lever Q, cam P, with its stud, and the revolving clutch *i*, all constructed and operating as described.

4. The combination, with the hammers E E′, anvil H, and laterally-oscillating furnace *g*, of the stationary cutter *m* and revolving cutter *l*, substantially as and for the purpose set forth.

5. The combination, with the two hammers, the anvil, and the oscillating furnace, of the continuously-revolving and longitudinally-reciprocating clutch *i*, for turning and feeding forward the rod, as and for the purpose described.

6. The combination, substantially as described, of the sliding stop *o*, hammer E, arm S, and cam *n*, as and for the purpose described.

7. The combination, with automatic mechanism for the manufacture of wrought-nails, of a furnace or other device for the reception and burning of gas, and the application of the heat thus generated to the heating of the nail-rod, substantially as set forth.

The above specification of my said invention signed and witnessed, at Washington, this 10th day of November, A. D. 1875.

JOSEPH ROY.

Witnesses:
CHAS. F. STANSBURY,
H. B. MUNN.